United States Patent
Duesel, Jr. et al.

(10) Patent No.: US 9,738,545 B2
(45) Date of Patent: Aug. 22, 2017

(54) METHOD AND DEVICE FOR CONCENTRATING DISSOLVED SOLIDS IN FLOWBACK AND PRODUCED WATER FROM NATURAL GAS WELLS

(71) Applicant: HEARTLAND TECHNOLOGY PARTNERS LLC, St. Louis, MO (US)

(72) Inventors: Bernard F. Duesel, Jr., Goshen, NY (US); Michael J. Rutsch, Pittsburgh, PA (US); Craig Clerkin, Stoughton, WI (US)

(73) Assignee: HEARTLAND TECHNOLOGY PARTNERS LLC, St. Louis, MO (US)

( * ) Notice: Subject to any disclaimer, the term of this patent is extended or adjusted under 35 U.S.C. 154(b) by 0 days.

(21) Appl. No.: 14/533,613

(22) Filed: Nov. 5, 2014

(65) Prior Publication Data

US 2015/0122498 A1    May 7, 2015

Related U.S. Application Data

(60) Provisional application No. 61/900,152, filed on Nov. 5, 2013.

(51) Int. Cl.
*C02F 1/04* (2006.01)
*E21B 43/26* (2006.01)
(Continued)

(52) U.S. Cl.
CPC ............. *C02F 1/048* (2013.01); *E21B 43/26* (2013.01); *C02F 1/16* (2013.01);
(Continued)

(58) Field of Classification Search
None
See application file for complete search history.

(56) References Cited

U.S. PATENT DOCUMENTS 5,300,123 A * 4/1994 Grott .................... B01D 9/0036
23/302 R
5,695,643 A * 12/1997 Brandt .................... C02F 1/441
166/267
(Continued)

FOREIGN PATENT DOCUMENTS

EP    1371790 A1    12/2003

OTHER PUBLICATIONS

International Search Report for International application No. PCT/US2014/063818, mailed Feb. 25, 2015.
(Continued)

*Primary Examiner* — Anuradha Ahuja
(74) *Attorney, Agent, or Firm* — Marshall, Gerstein & Borun LLP

(57) ABSTRACT

A flowback water concentrating system, and method, include a liquid evaporator assembly that concentrates flowback water, a gas-liquid separator that separates entrained liquid from a gas exiting the liquid evaporator assembly, an exhaust assembly that vents exhaust gases, and a flowback water concentrating system that separates the concentrated flowback water into a supernatant liquid and a concentrated slurry. The flowback water concentrating system includes a settling tank fluidly connected to the gas-liquid separator and a supernatant liquid concentration sensor for measuring a concentration of dissolved solids in the supernatant liquid in the settling tank.

11 Claims, 6 Drawing Sheets

(51) Int. Cl.
| | |
|---|---|
| C02F 1/16 | (2006.01) |
| C02F 103/10 | (2006.01) |
| C02F 1/00 | (2006.01) |
| C02F 101/32 | (2006.01) |
| C02F 103/36 | (2006.01) |

(52) U.S. Cl.
CPC .... *C02F 2001/007* (2013.01); *C02F 2101/32* (2013.01); *C02F 2103/10* (2013.01); *C02F 2103/365* (2013.01); *C02F 2201/002* (2013.01); *C02F 2201/008* (2013.01); *C02F 2209/05* (2013.01); *C02F 2209/10* (2013.01); *C02F 2303/14* (2013.01)

(56) References Cited

U.S. PATENT DOCUMENTS

| | | | | |
|---|---|---|---|---|
| 6,085,911 | A | 7/2000 | Greenleigh et al. | |
| 8,066,844 | B2* | 11/2011 | Duesel, Jr. | B01D 1/14 159/16.2 |
| 8,066,845 | B2* | 11/2011 | Duesel, Jr. | B01D 1/14 159/16.2 |
| 8,535,538 | B1* | 9/2013 | Keeling | C02F 9/00 166/266 |
| 8,568,557 | B2* | 10/2013 | Duesel, Jr. | B01D 1/14 159/16.2 |
| 8,679,291 | B2* | 3/2014 | Duesel, Jr. | B01D 1/14 159/16.1 |
| 8,721,771 | B2* | 5/2014 | Duesel, Jr. | B01D 1/14 110/203 |
| 8,741,100 | B2* | 6/2014 | Duesel, Jr. | B01D 1/14 159/4.01 |
| 8,790,496 | B2* | 7/2014 | Duesel, Jr. | B01D 1/14 203/12 |
| 8,801,897 | B2* | 8/2014 | Duesel, Jr. | B01D 1/14 159/16.2 |
| 2007/0045100 | A1* | 3/2007 | Wright | B01D 1/14 203/49 |
| 2007/0051513 | A1* | 3/2007 | Heins | E21B 43/40 166/265 |
| 2007/0102154 | A1* | 5/2007 | Grott | C02F 1/42 166/266 |
| 2009/0294074 | A1 | 12/2009 | Forstmanis | |
| 2009/0294377 | A1* | 12/2009 | Gallot | B01D 1/0047 210/737 |
| 2010/0038310 | A1* | 2/2010 | Shafer | C02F 9/00 210/605 |
| 2010/0125044 | A1* | 5/2010 | Keister | E21B 21/068 507/200 |
| 2010/0224561 | A1* | 9/2010 | Marcin | B01D 61/00 210/644 |
| 2010/0236724 | A1* | 9/2010 | Duesel, Jr. | B01D 1/14 159/4.02 |
| 2010/0264068 | A1* | 10/2010 | Ikebe | C10G 1/002 208/391 |
| 2011/0061816 | A1* | 3/2011 | Duesel, Jr. | B01D 1/14 159/4.01 |
| 2011/0083556 | A1* | 4/2011 | Duesel, Jr. | B01D 1/14 95/158 |
| 2011/0100924 | A1* | 5/2011 | Duesel, Jr. | B01D 1/14 210/710 |
| 2011/0137465 | A1* | 6/2011 | Angelilli | C02F 1/763 700/271 |
| 2012/0171091 | A1 | 7/2012 | DiTommaso et al. | |
| 2012/0279925 | A1* | 11/2012 | Miller | C02F 1/52 210/723 |
| 2013/0037223 | A1* | 2/2013 | Duesel, Jr. | B01D 1/14 159/4.01 |
| 2013/0048562 | A1* | 2/2013 | Keister | C01D 3/06 210/638 |
| 2013/0048575 | A1* | 2/2013 | Gruber | C02F 1/24 210/749 |

OTHER PUBLICATIONS

Written Opinion for International application No. PCT/US2014/063818, mailed Feb. 25, 2015.
International Preliminary Report on Patentability for application No. PCT/US2014/063818, issued May 10, 2016.

* cited by examiner

METHOD AND DEVICE FOR CONCENTRATING DISSOLVED SOLIDS IN FLOWBACK AND PRODUCED WATER FROM NATURAL GAS WELLS

This application claims the benefit of Provisional U.S. Patent Application No. 61/900,152, filed Nov. 5, 2013, the entirety of which is incorporated herein by reference.

BACKGROUND

Field of the Disclosure

The disclosure generally relates to methods and devices for concentrating wastewater and more particularly to methods and devices for concentrating dissolved salts in flowback and produced water from natural gas wells.

Background

Natural gas is a naturally occurring hydrocarbon gas having many beneficial uses. Natural gas is an emerging world-wide energy source that may be used for electrical generation and vehicle propulsion, among other uses. Natural gas is also useful as a chemical feedstock in the manufacture of plastics and other organic chemicals. Natural gas is most often found deep underground and thus, must be extracted by drilling a well. After the well is drilled, the natural gas seeps into the well bore, where it can be removed and stored for refining and future use.

As more easily accessible natural gas formations are mined out, natural gas producers are turning more and more to natural gas rich rock formations, such as shales, which have a matrix permeability that is too low to allow gas to flow through, or out of, the formation. Hydraulic fracking was developed to access natural gas contained in these formations. Hydraulic fracking involves pumping large volumes of water, often under pressure, into these formations in an attempt to create small cracks in the rock formation, which allow the natural gas to flow back into the well bore, where it can be extracted. Once the rock formation is fracked, the natural underground pressure may be sufficient to force the natural gas into the well bore. Alternatively, to enhance natural gas collection, additional water may be forced into the well under pressure to increase the down bore pressure, which causes natural gas to displace into the well bore more quickly.

One way to enhance down bore pressures is to increase the density of the liquid that is pumped down the well. Most often, density of the fracking water is increased by mixing salt into the water until the water is close to, or at, the saturation point for the salt. The particular salt also influences the final density of the fracking water. Artificially increasing the density of the fracking water in this manner, while accomplishing the main goal of increasing downbore pressure, is relatively expensive, which increases the costs of extracting the natural gas, often far beyond the point of economic feasibility.

The natural, or enhanced, down bore pressures also cause some of the fracking water (known as flowback water) to also seep back into the well bore. Additionally, naturally occurring ground water may also seep into the well bore (after a certain amount of time, this type of water is called produced water). Because the flowback waters and produced waters were in contact with mineral formations deep underground, these two types of wastewater contain many types of dissolved solids (such as salts) and suspended solids, such as silica, which must be processed in accordance with environmental regulations.

DETAILED DESCRIPTION

Generally, the methods and devices described herein address two problems in the hydraulic fracking natural gas industry. The methods and devices described herein reduce the volume of flowback and produced water by evaporating a portion of the water, which reduces transportation costs and treatment costs for the remaining concentrated liquid. The methods and devices described herein also concentrate dissolved solids, such as salts, that are present in the flowback and produced water, which results in beneficial increases in the density of the concentrated flowback and produced waters, so that the concentrated flowback and produced waters may be re-used as fracking liquids, which further reduces treatment costs while enhancing down bore fracking pressures. A further benefit of the methods and devices described herein is that the concentrated flowback and produced waters (which may be referred to hereinafter as "concentrated brines") may function as anti-freeze during cold weather fracking operations or during cold weather natural gas extraction operations. Finally, heavy concentrated brines may be used as capping fluids during oil well drilling to prevent blow up when an oil pocket is punctured. In the disclosure, the term "heavy concentrated brines" refers to brine liquids having a density of more than 8 lb/gal.

Figure 1:
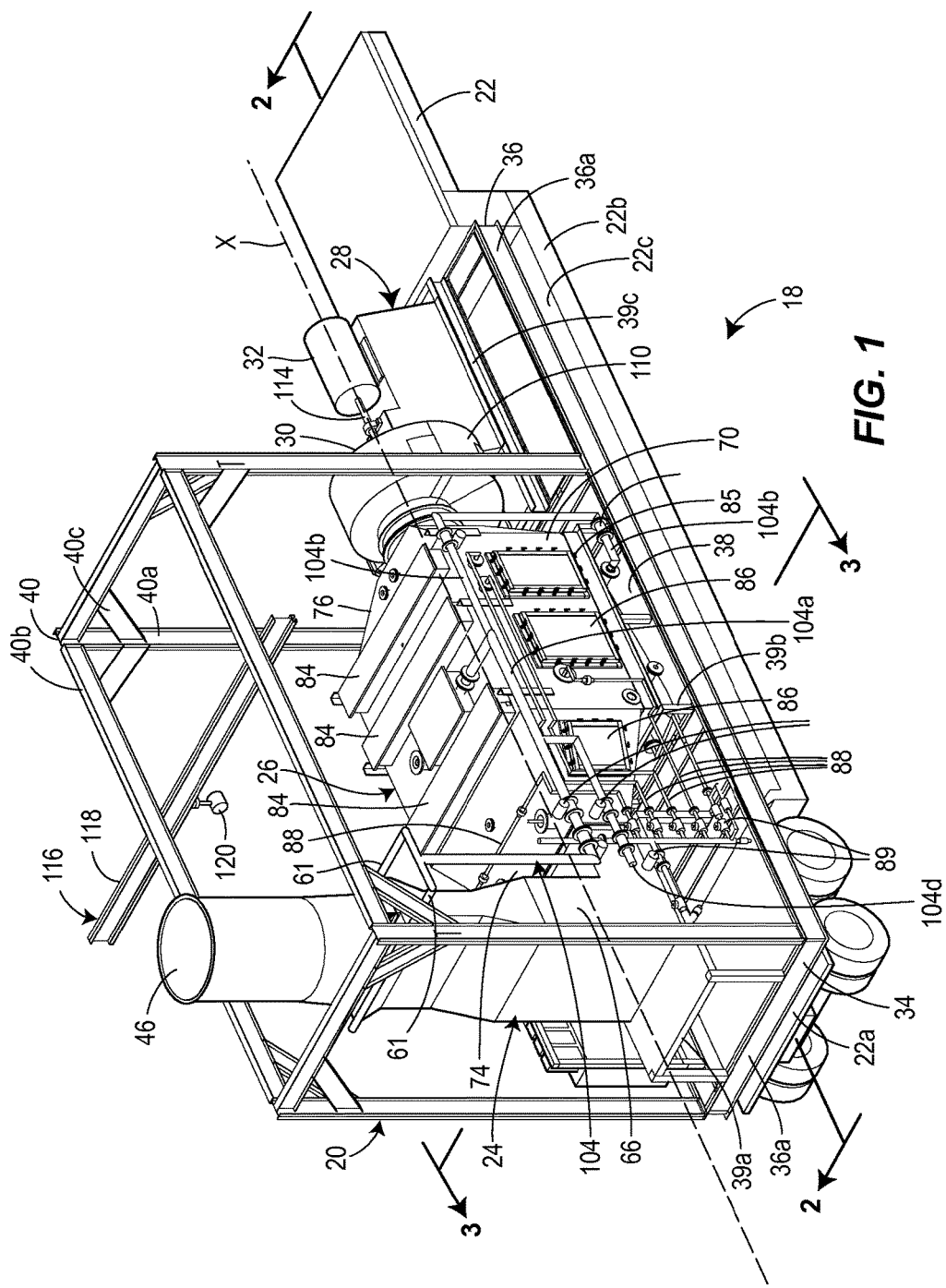
FIG. 1 is an isometric view of a wastewater concentrator assembly constructed in accordance with the teachings of the disclosure.
Figure 2:
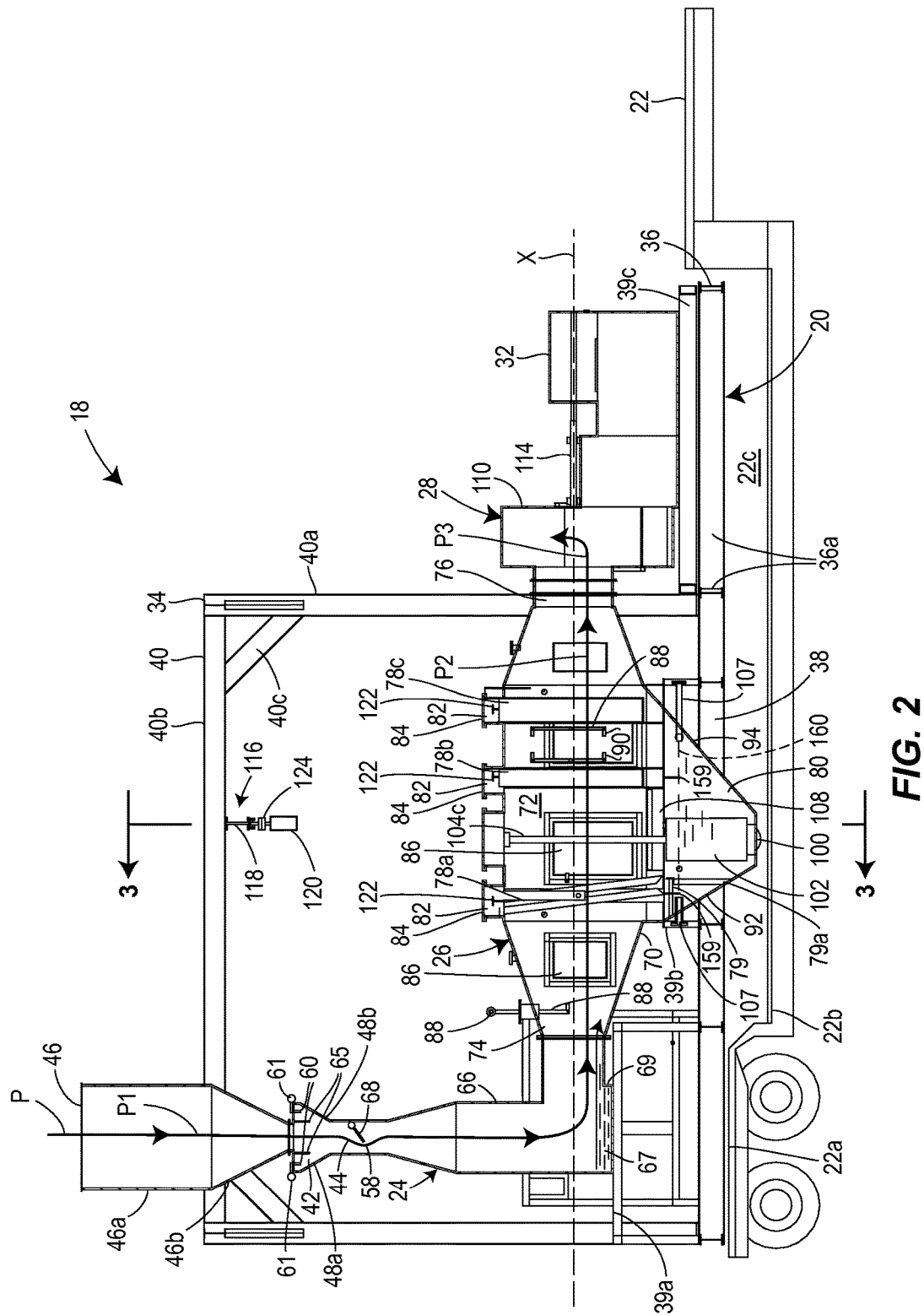
FIG. 2 is a cross-sectional elevation of the wastewater concentrator assembly along the lines 2-2 of FIG. 1.
Figure 3:
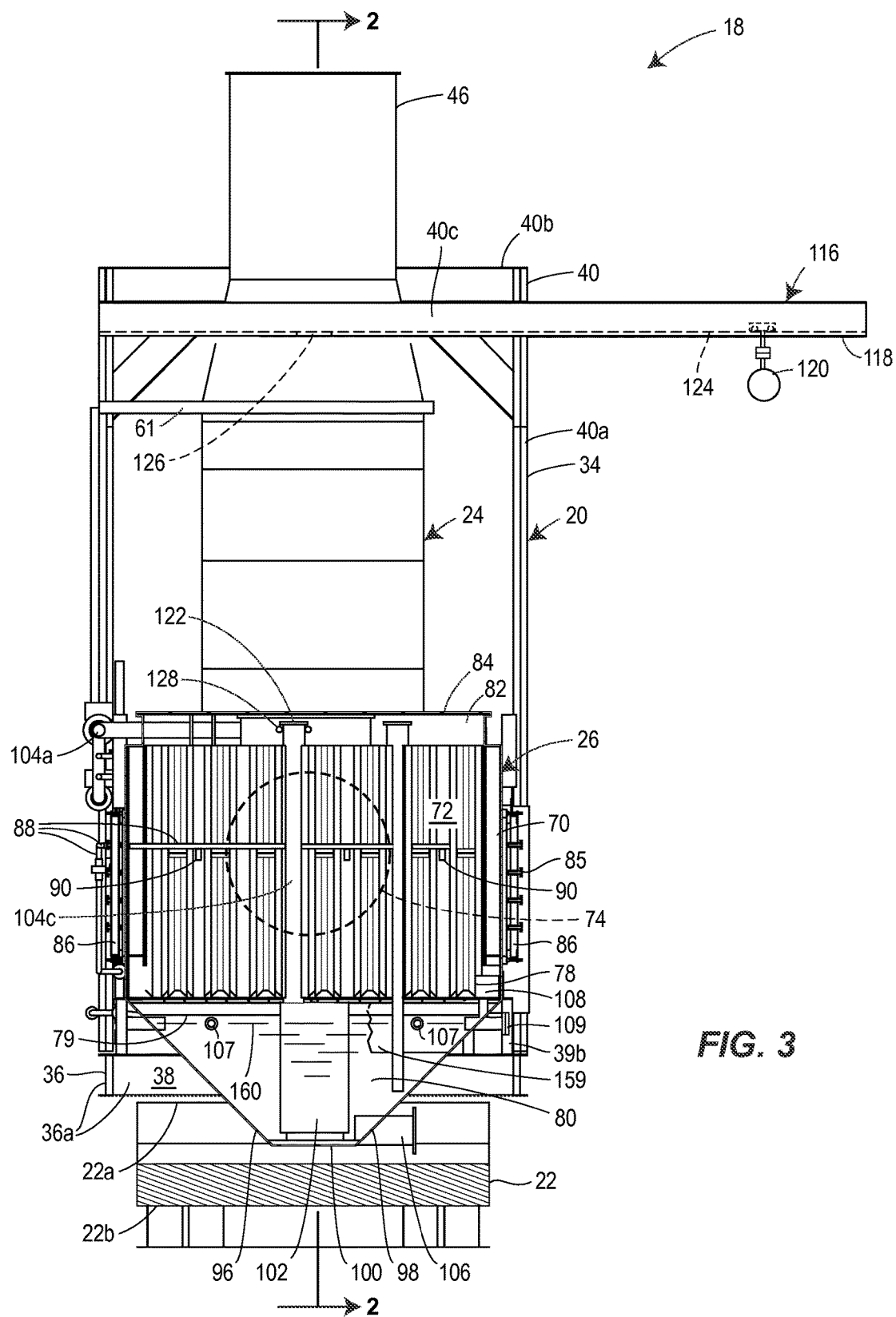
FIG. 3 is a cross-sectional elevation of the wastewater concentrator assembly along the lines 3-3 of FIG. 1.

Turning now to the drawings, FIGS. 1-3 illustrate one embodiment of a wastewater concentrator assembly 18 including a wastewater concentrator 20 being carried on a mobile hauling platform 22, such as a truck bed or a trailer, as a single unit. The wastewater concentrator 20 can be hauled as a substantially single unit on the mobile hauling platform 22 on highways and service roads and may be set up for operation either on the hauling platform or may removed from the hauling platform 22 as a single unit and be installed in a permanent or semi-permanent arrangement at a remote operating site, such as an industrial plant, mine site, petrochemical or natural gas extraction site, and the like. In other embodiments, the wastewater concentrator 20 may be transported in multiple pieces, or even as individual components that may be assembled at the operating site. In addition, the wastewater concentrator 20 is sizable to have an effective treatment capacity of up to forty thousand gallons per day or more without requiring substantial modification to the basic design disclosed herein. The wastewater concentrator 20 in some arrangements includes many aspects and design details of the wastewater concentrators described in detail in U.S. Pat. No. 8,568,557, issued Oct. 29, 2013, which is incorporated by reference in its entirety herein.

The mobile hauling platform 22 may preferably be a semi-trailer, such as a standard double-drop semi trailer, having an upper level carrying surface 22a and a lower level carrying surface 22b defining a recessed portion 22c below the upper level carrying surface. However, the mobile hauling platform 22 may be any hauling platform with wheels or tracks, for example, that is adapted to be drawn or moved by a truck, tractor, team of oxen, or other such mobile pulling unit capable of carrying the wastewater concentrator 20 on roads and over ground. Alternatively, for example, the mobile hauling platform 22 could be a flat bed truck. In some optional arrangements, the wastewater concentrator is carried by a first mobile hauling platform, such as a semi-truck trailer, and accessories are carried by one or more additional mobile hauling platforms, such as by two additional semi-truck trailers. In an optional arrangement, a permanent wastewater concentrator unit may be formed by integrating a skid 34 to a standard single drop trailer, wherein the skid and trailer frame are permanently secured together into a single unit, such as by welding or fasteners.

The wastewater concentrator 20 includes a liquid evaporator assembly 24, an entrainment separator or demister in the form of a gas-liquid separator 26, and an exhaust assembly 28. The gas-liquid separator 26 is operatively connected with the liquid evaporator assembly 24, and the exhaust assembly 28 is operatively connected with the gas-liquid separator 26. The wastewater concentrator 20 also includes an air pump 30, such as an induction fan, and a power source 32, such as an electric or pneumatic motor, arranged to drive the air pump 30. The skid 34 may carry and support the components of the wastewater concentrator 20 as a single unit in the embodiment illustrated in FIGS. 1-3. Together, the liquid evaporator assembly 24, the gas-liquid separator 26, and the exhaust assembly 28 form a confined gas flow path P, wherein gases and/or entrained wastewater flow along the confined gas flow path P through the wastewater concentrator 20 from the liquid evaporator assembly 24 through the gas-liquid separator 26 and out the exhaust assembly 28 to the surrounding atmosphere and/or other discharge ports.

The skid 34 may take any form sufficient to allow the wastewater concentrator 20 to be lifted as a single unit off of the mobile hauling platform 22 and onto an operating platform at an operating site by, for example, a crane. In a preferred arrangement, the skid 34 forms a generally planar horizontal support frame 36 formed of beams 36a, such as steel I-beams, C-section beams, tubing, and the like, in a rectangular shape sufficient to surround an outer peripheral footprint of the liquid evaporator assembly 24, the gas-liquid separator 26, and the exhaust assembly 28. The beams define at least a central opening 38, and preferably define several openings through the horizontal support frame 36. The horizontal support frame 36 preferably is disposed at least below the liquid evaporator assembly 24, the gas-liquid separator 26, the air pump 30, and the power source 32, each of which is preferably secured to the horizontal support frame 36, either directly or indirectly by intermediate supports, such as support frames 39a, 39b, and 39c. The horizontal support frame 36 in the depicted arrangement includes four peripheral I-beams, including of two long beams and first and second end cross-beams connected to form a rectangle having a long dimension aligned with a longitudinal axis of the liquid evaporator assembly 24, gas-liquid separator 26, and exhaust assembly 28; first, second, and third longitudinally spaced apart cross-beams extending orthogonal to the longitudinal axis between the first and second end cross-beams and disposed under the gas-liquid separator; and first and second laterally spaced apart longitudinal runners extending from the second end cross-beam to the adjacent third cross-beam under the exhaust assembly 28. The skid 34 is arranged to be removably supported by the mobile hauling platform 22, for example with the horizontal support frame 36 disposed on the upper level 22a of the mobile platform 22.

The support frames 39a, 39b, and 39c support and connect the liquid evaporator assembly 24, gas-liquid separator 26, and exhaust assembly 28, respectively, to the horizontal support frame. In the arrangement depicted in the drawings, the support frame 39a is in the form of a table having a top and four legs, wherein the liquid evaporator assembly 24 rests on the top, and the four legs are connected to the first end cross-beam and the adjacent first cross-beam of the support frame 36. The support frame 39b is in the form of a rectangular upper frame and four legs disposed over the central opening 38, wherein the upper frame is connected to an underside periphery of the gas-liquid separator 26, and the four legs are connected to the first cross-beam and second cross-beam of the support frame 36. The support frame 39b does not have a top and a sump of the gas-liquid separator projects downwardly through the rectangular upper frame and the central opening 38 as described hereinafter. The support frame 39c is in the form of a rectangular frame formed of I-beams, wherein the air pump 30 and power plant 32 are connected to the rectangular frame and the rectangular frame is connected to the first and second longitudinal runners, the second end cross-beam, and the adjacent third cross-beam.

The skid 34 preferably also includes a lift frame 40 extending above the horizontal frame formed, for example, of columns and cross-beams of steel members, such as I-sections, C-sections, tubing, and the like. The lift frame 40 in the depicted arrangement includes four vertical columns 40a extending upwardly from an outer periphery of the horizontal support frame 36; longitudinal beams and cross-beams 40b that form a rectangular frame and connect the vertical beams; and corner braces 40c at one or more of the intersections between a longitudinal beam 40b, a cross-beam 40b, and a vertical column 40a. The vertical columns 40a preferably are located around the outer periphery of a significant portion of at least the liquid evaporator assembly 24 and gas-liquid separator 26, as shown in the drawings, thereby forming a scaffolding surrounding at least the same. The lift frame 40 is in some arrangements used to support a hoist, as described hereinafter, and may be constructed after the skid 34 is set in place at an operating location.

The skid 34 may be made of any materials suitable for supporting the wastewater concentrator 20 as a movable unit as described herein, such as steel, and connected, for example, by welds, bolts, and/or rivets. Preferably, the skid 34 is sized and arranged to be hauled on a semi-truck trailer on highways. In one arrangement, as depicted in the drawings, the skid 34 has a length along the longitudinal axis of approximately thirty nine feet (11.89 m), a width of approximately ten feet four inches (3.15 m), and a height of approximately twenty feet (6.10 m).

The liquid evaporator assembly 24 is arranged to receive wastewater and evaporate water from the wastewater into a stream of gas, such as hot waste gas from the exhaust of another process. The liquid evaporator assembly 24 preferably includes a venturi evaporator, which evaporates the water by mixing the wastewater and gases and passing the mixture through a venturi section that rapidly reduces the static pressure of the mixture and further mixes the wastewater and gases an amount sufficient to cause rapid evaporation of the water from the wastewater. As best seen in FIG. 2, the liquid evaporator assembly 24 includes a mixing chamber 42 connected with a venturi assembly 44, which together define a first portion P1 of the confined gas flow path P.

The mixing chamber 42 has a gas inlet 46 arranged for connection with one or more sources of gases, and two opposing slanted side walls 48a, 48b that at least partly define and narrow the first portion P1 of the confined gas flow path from the gas inlet 46 toward the venturi assembly 44. Thus, the confined gas flow path P has a first cross-sectional area on an inlet, or upstream side of the slanted walls 48a, 48b and a second, smaller cross-sectional area on a venturi, or downstream side of the slanted walls. The mixing chamber 42 is preferably elevated above the venturi assembly 44 and may be adapted to be coupled with a supply manifold 50 (FIG. 2A) that collects heated gas from one or more separate sources of heated exhaust gases. In the arrangement depicted in the drawings, the gas inlet 46 has a cylindrical tube section 46a, a transition section 46b that transitions from a circular cross-section to a rectangular cross-section that exhausts into an elongate rectangular tapered trough section defined partly by the slanted side walls 48a, 48b that extend between two side walls.

A plurality of injection nozzles 60 project into the trough section of the mixing chamber 42 downstream of the gas inlet 46 and upstream of the venturi section 44. Each injection nozzle 60 is connected with a supply of wastewater, such as concentrated wastewater from wastewater return pipes 61 disposed on opposite exterior sides of the trough section, and is arranged to inject the wastewater into the mixing chamber 42 directly against one of the slanted side walls 48a, 48b. The wastewater return pipes 61 in a preferred arrangement carry re-circulated concentrated wastewater, such as partially concentrated wastewater drawn from the gas-liquid separator 26. Each injection nozzle 60 includes a nozzle section that is pointed downwardly toward, and adapted to inject the wastewater against, the adjacent slanted side wall 48a or 48b. Injecting the wastewater against the slanted side walls 48a, 48b precludes (or reduces) the development of fine droplets prior to entry of the gas/liquid mixture into the venturi assembly 44. This, in turn, prevents complete drying of fine droplets (which could cause fouling problems) because once the fine droplets are formed in the venturi assembly 44, complete drying is minimized or eliminated due to the limited residence time and the fast approach to adiabatic saturation temperatures. Moreover, any dry particulate that may be formed is scrubbed off of the side walls due to the high velocities in the venturi assembly 44. Preferably, the nozzle section is connected to the wastewater return pipe 61 by a liquid supply conduit, which in some instances extends horizontally from the wastewater return pipe 61. In some arrangements, either the nozzle section extends downwardly through a horizontal wall of the mixing chamber or the liquid supply conduit extends horizontally through a sidewall of the mixing chamber 42. In other arrangements, the lowest distal end of the nozzle section may be flush with the horizontal wall of the mixing chamber. The nozzle section may be formed of an open ended tube, and the liquid supply conduit may be formed of another tube that has an inside diameter less than an inside diameter of the open ended tube. In a preferred arrangement, the liquid evaporator assembly 24 includes four of the injection nozzles 60, two directed against each of the opposing slanted side walls 48a, 48b, and each nozzle section has an inside diameter of between approximately 10 mm and 0.5 mm and preferably approximately 2.5 mm (1 inch). However, fewer or more injection nozzles may used. Optionally, the nozzles 60 and/or the nozzle sections are removably secured to provide for easy removal, maintenance, and re-installation.

Nozzle shrouds 65 optionally are arranged to protect the nozzles 60 from direct contact with the heated gases from gas inlet 46. Because the heated gases may have very hot temperatures, such as of several hundreds of degrees Celsius, direct contact with the nozzles may cause excessive scaling of salts on the nozzles 60 and thereby lead to plugging and/or otherwise cause decreased functionality. Preferably, the nozzle shrouds 65 are disposed between each nozzle 60 and the direct stream of heated gases and arranged to deflect the direct stream of heated gasses from impinging against the nozzles 60. For example, the shrouds 65 depend or extend downwardly from the horizontal wall of the mixing chamber between the nozzle section and the opening between the gas inlet 46 and the mixing chamber 42. Preferably, each shroud 65 extends downwardly past the lowest distal end of the nozzle section.

In a preferred option, raw or un-concentrated wastewater, i.e., wastewater that has not been treated by the portable wastewater concentrator 20, is supplied to the confined gas flow path P at a location upstream from the nozzles 60. In one arrangement, the raw wastewater is injected into the confined gas flow path P with one or more feed nozzles 63 (FIG. 3). The feed nozzles 63 are located to inject the raw wastewater into the gas inlet 46 or into the manifold. The raw wastewater injected with the feed nozzles 63 in some instances may quench the hot gasses from the heat sources 52. Quenching includes cooling the hot gasses and entraining the raw wastewater into the flow of hot gasses prior to reaching nozzles 60 and/or entering the mixing chamber 42. In some arrangements, the feed nozzles 63 are arranged to inject the raw wastewater as droplets to increase quenching.

The venturi assembly 44 receives the mixture of gas and wastewater from the mixing chamber 42 and includes an adjustable throat 58 arranged to allow selective variation of the cross-sectional area of the venturi to increase or decrease the velocity of the gases and thus the pressure drop across the throat. The cross-sectional area of the adjustable throat 58 may be increased or decreased in any available manner, such as with one or more movable orifice plates 68. In one arrangement, the orifice plate 68 is formed by a baffle that is pivotable around a hinge between a first position that closes the throat 58 and a second position that opens the throat 58. The orifice plate 68 may be pivoted by any actuator (not shown) sufficient to controllably move the baffle between the first and second positions, such as a gear and/or lever arm functionally connected with a linear actuator, a rotary actuator, a manual positioning actuator, and/or a servo motor. In the depicted arrangement, the throat 58 is formed of a narrow rectangular duct section attached to the narrowest portion of the trough section of the mixing chamber and an outwardly tapered rectangular duct section extending from a downstream side of the narrow rectangular duct section. The orifice plate 68 is a rectangular plate that pivots around an axis, such as a rod or hinge, extending along one side of the long dimension of the narrow rectangular duct section forming the throat 58. Although only one orifice plate 68 is shown in the drawings, larger units, such as units designed to process 40,000 gallons or more per day, may include two movable orifice plates 68 across the throat 58, for example disposed on opposite sides of the throat 58 and arranged to close by moving toward each other and to open by moving away from each other.

The mixing chamber 42 and the venturi assembly 44 are preferably oriented generally vertically, as shown in the drawings, with the mixing chamber disposed above the venturi assembly, which in some arrangements provides for even distribution of wastewater across the cross-sectional area of the first portion P1 of the confined flow path P. The liquid evaporator assembly 24 as shown also includes an elbow duct section 66 connected to the downstream side of the outwardly tapered rectangular duct section of the venturi assembly 44 and connected to the gas-liquid separator 26. The elbow duct section 66 is arranged to conduct the mixture of gases and wastewater from the venturi assembly 44 into the gas-liquid separator 24. The elbow duct section 66 rests on and is supported by the top the support frame 39a. In the depicted arrangement, the mixing chamber 42, the venturi assembly 44, and the elbow duct section 66 have generally rectangular cross-sectional forms. However, the mixing chamber 42, the venturi assembly 44, and the elbow duct section 66 may have other shapes and arrangements.

A flooded elbow is formed at the bottom of the elbow duct section 66 by a sump 67 located where the duct changes direction from a vertical air flow path to a horizontal air flow path. The sump 67 is formed by a shallow recess at the bottom of the vertical section of the elbow duct section 66 and includes a raised lip 69 or weir between the sump 67 and an inlet 74 into the gas-liquid separator 26. As mixed wastewater and gasses flow from the venturi 44, the abrupt change in direction of the mixture from the vertical to the horizontal, such as approximately a 90 degree angle, causes at least some heavier droplets of wastewater to collect in the sump 67. As wastewater collects in the sump 67, the level of the collected wastewater rises until the collected wastewater overflows the raised lip 69 and runs down the inlet 74 into the sump 80 of the gas-liquid separator. Thus, the sump 67 forms a preliminary or first stage water removal. The collection of wastewater in the sump 67 may also reduce erosion of the interior surface of the elbow duct section 66 that may otherwise be caused by entrained suspended solids, such as precipitated particles, within the high velocity flow of gasses and wastewater.

The gas-liquid separator 26 includes a body 70 defining an enclosed separation chamber, such as a demister chamber 72, the inlet 74 that receives the mixture of gases and wastewater from the venturi assembly, an exhaust outlet 76 that is connected with the exhaust assembly 28, and a sump 80 disposed at a bottom of the body. The gas-liquid separator 26 defines a second portion P2 of the confined gas flow path P, which extends through the demister chamber 72 from the inlet 74 to the exhaust outlet 76. The body 70 has a generally rectangular polyhedron shape surrounding the demister chamber 72, having a rectangular top panel, and opposing rectangular side walls extending down from opposite side edges of the top panel. Each of the inlet 74 and the exhaust outlet 76 has a truncated pyramidic shape, having top, bottom, and opposite side walls, each of which tapers or slopes outwardly from the respective inlet and outlet toward the demister chamber 72. When assembled in a preferred operating position, the inlet 74 and the exhaust outlet are aligned substantially horizontally along a longitudinal axis X through the body 70.

One or more, and preferably three demister panels 78a, 78b, and 78c are disposed inside the demister chamber 72 and arranged to separate wastewater entrained in the gases from the gases. Preferably, the demister panels 78a-c are disposed across the confined gas flow path P with each forming a tortuous gas flow path through demister chamber 72 to separate entrained wastewater droplets from the gases.

In the depicted embodiment, for example, the second portion P2 of the confined gas flow path P extends along the substantially horizontal longitudinal axis X from the inlet 74 to the exhaust outlet 76, and the demister panels 78 are aligned generally orthogonally to and across the longitudinal axis. The demister panels 78b, 78c closest to the exhaust outlet 76 are preferably chevron demisters and are aligned vertically and orthogonally across the second portion P2 of the confined gas flow path. The chevron demisters are carried by a generally rectangular peripheral support frame that extends around a peripheral side edge of each chevron demister. The demister panel 78a closest to the inlet 74 is preferably formed of half-tube sections, similar to common sheet-piling sections, that are vertically oriented and horizontally spaced apart and overlapping, carried by a support frame. The half-tube sections are slanted or sloped between approximately two degrees and fifteen degrees from the vertical. The support frame includes vertical side posts on opposite ends of the half-tube sections, and a support member, such as a horizontal rod that extends between the vertical side posts. Preferably, each demister panel 78a-c has a generally planar peripheral form factor and spans the entire area across the demister chamber 72 between the side walls and top wall of body 70 to force the gases and entrained wastewater to go through each demister panel to ensure maximum separation of entrained wastewater from the gases. Each of the demister panels 78a-c preferably is assembled to be moved as a single unit, with each demister panel carried by the support frame for easy installation into and removal from the demister chamber 72, for example as describe hereinafter.

A screen 79, such as an elongate metal grate, is disposed inside the gas-liquid separator 26 immediately below the bottom of the demister panel 78a. The screen 79 is arranged to prevent large particles knocked down by the demister panel 78a, such as trash or cinders, from falling into the sump 80 and subsequently being sucked through the sump pump 102. The screen 79 extends completely from the left to right side walls of the body 70 and is supported from the sump by, for example, a brace 79a.

A top access opening 82 is formed in the top wall of the body 70 directly above each demister panel 78a-c to allow each demister panel to be installed and removed vertically through the top wall, by a hoist or crane, for example. Each top access opening 82 preferably is covered with a removable hatch 84, such as a door or panel, bolted or otherwise latched to the body, or preferably, retained in a closed position by a quick-release latching system 85 that can be quickly locked and unlocked, such as pivotable latches and cam locks, and/or spring latches, without requiring disassembly of the locking mechanism. Each top access opening 82 is shaped complementary to the respective demister panel 78, such as by being, for example, in the shape of a long narrow rectangular slot having a width slightly larger than a width of the respective demister panel 78 and a length slightly longer than a length of the respective demister panel. Thus, for example, the top access openings 82 shown in the drawings extend completely to each opposite side wall of the body 70.

A plurality of access doors 86 are disposed in side walls of the body 70, the inlet 72, and the exhaust outlet 74 to provide ready access to all regions of the interior of the gas-liquid separator 26. The access doors 86 are releasably retained in a closed position by the quick-release latching system 85 that can be quickly locked and unlocked, such as pivotable latches and cam locks, and/or spring latches, without requiring disassembly of the locking mechanism.

The access doors 86 are preferably sized to allow easy ingress and egress of a person into and out of the gas-liquid separator 26.

Figure 2A:
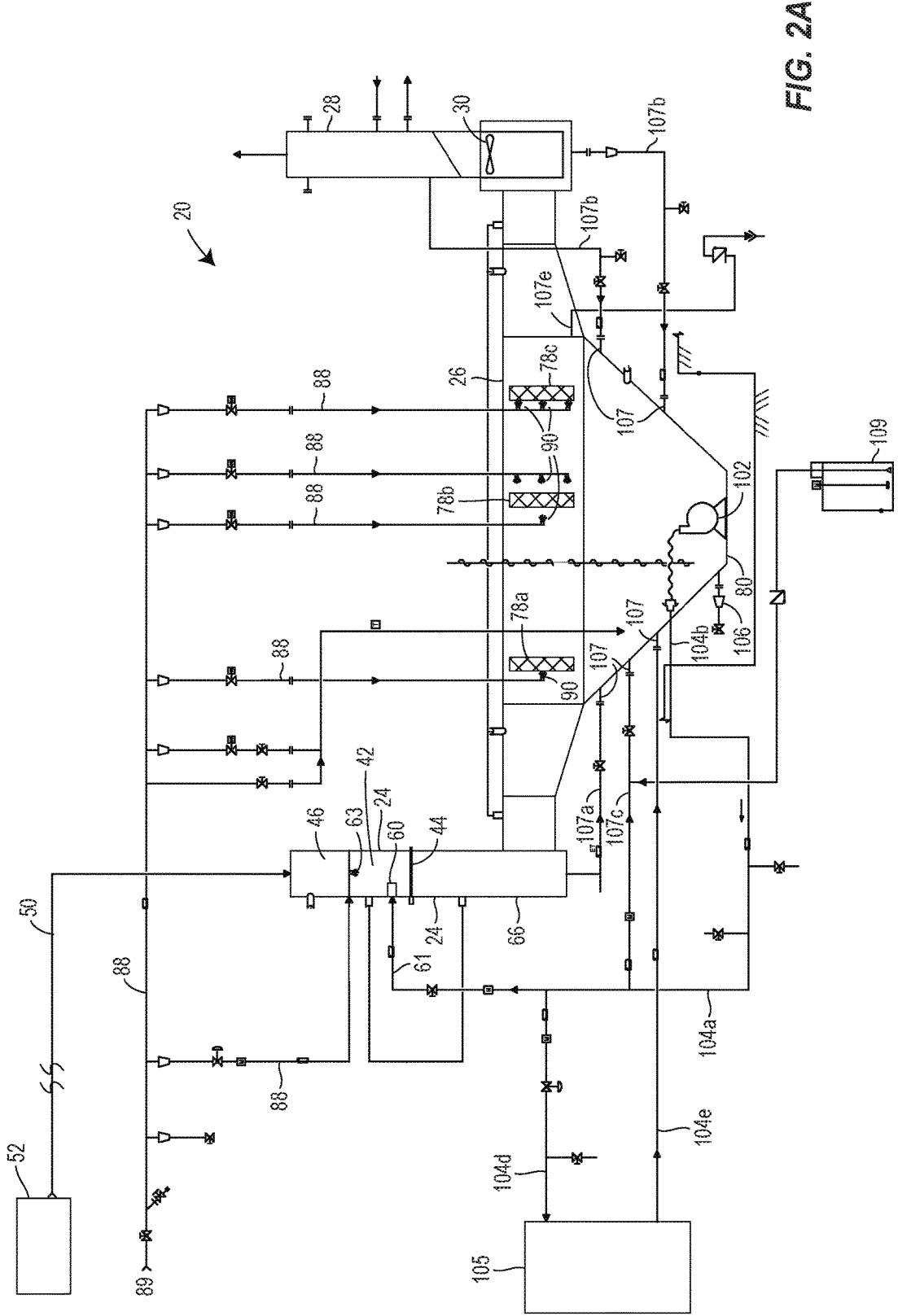
FIG. 2A is a schematic piping and instrumentation diagram generally along the cross-sectional elevation of FIG. 2.

A wash water system is included as part of the gas-liquid separator 26 to easily wash scale and/or other accumulated solids off of the demister panels 78. In one exemplary arrangement, as best seen in FIG. 2A, feed pipes 88 extend into the demister chamber 72 and feed wash water to a number of nozzles 90 that are arranged to spray the wash water onto the demister panels 78. The feed pipes 88 are connected with a source 89 of wash water (not shown), preferably the raw wastewater, and one or more pumps (not shown) may be connected with the feed pipes to pump the wash water to the nozzles 90 to spray the demister panels 78. Optionally, at least one of the feed pipes 88 in one arrangement also is arranged to provide wash water to the mixing chamber 42 to wash the internal area of the mixing chamber and/or to supply the feed nozzles 63.

The sump 80 defines the bottom of the gas-liquid separator 26, and preferably is defined by a bottom of the body 70 directly below the demister chamber 72. The sump 80 is arranged to collect wastewater that has collected in the sump 67 of the elbow duct section 66, on the inner walls of the demister chamber 72, and on the demister panels 78, such as by being disposed directly below the demister panels 78 so that wastewater collected on the demister panels 78, the sump 67, and the inner walls of the demister chamber 72 can drip downwardly under the force of gravity and be collected in the sump. The sump 80 projects downwardly from the body 70 through the central opening 38 of the horizontal support frame 36 and below the skid 34 and may be scaled up or down as needed to accommodate treatment capacities of more than approximately twenty thousand gallons per day, and preferably between at least twenty thousand and sixty thousand gallons per day, and in one preferred embodiment up to at least approximately forty thousand gallons per day and more. The sump 80 is shaped and arranged to collect wastewater from the sump 67 and all regions of the demister chamber 72 and preferably has slanted or sloped walls extending downwardly from around the entire outer periphery of the demister chamber, such as having the form of an inverted cone or a truncated inverted pyramid with four sloped walls, a front wall 92 closest to the inlet 74, a rear wall 94 closest to the exhaust outlet 76, and two side walls 96, 98 spanning from the front wall to the rear wall, extending downwardly from the bottom of the body 70 directly below the demister panels 78. The truncated inverted pyramid form also preferably includes a bottom wall 100 connecting the bottom ends of the sloped side walls 92, 94, 96, 98. At least one, and preferably each, sloped wall 92, 94, 96, 98 forms an angle between 0 degrees and 90 degrees from the horizontal longitudinal axis X of the gas-liquid separator 76. For example, the front wall 92 is sloped at an angle of between approximately thirty five degrees and sixty five degrees from the horizontal longitudinal axis X, and more preferably an angle of approximately fifty five degrees. Each of the rear wall 94 and two side walls 96, 98 is preferably sloped at an angle between approximately forty five degrees and approximately fifty five degrees, and more preferably at an angle of about forty five degrees from the horizontal longitudinal axis X. The bottom wall 100 of the sump 80 preferably defines a lowest hydraulic point in confined gas flow path P through the wastewater concentrator 20, and a submersible sump pump 102 is disposed on the bottom wall 100 at the bottom of the sump 80. The submersible sump pump 102 pumps wastewater that collects in the sump 80 through a recirculation system that returns the collected wastewater to the injection nozzles 60 for recirculation through the liquid evaporator assembly 24. In a preferable mode of continuous operation, a slipstream of the submersible pump 102 discharge may be withdrawn from the concentrator 18 system at a controlled rate to maintain a desired equilibrium level with regard to a degree of concentration of the feed wastewater.

In one arrangement, the sump 80 is secured to the demister chamber 72 such that the sump 80 may be removed, such as for transportation, and/or attached at the operating site, such as when the wastewater concentrator 20 is set up for operation at an operating site. The sump 80 may be releasably attached in any manner sufficient to allow selective attachment and removal. Some exemplary releasable attachment mechanisms include releasable fasteners, such as bolts or clamps, or with releasable interlocking mechanisms, such as bayonet-type locking mechanisms, or other similar releasable interlocking mechanisms. In one arrangement, the sump 80 is attached to the demister chamber 72 at the operation site with fiberglass. In another arrangement, the sump 80 is removably secured to the demister chamber 72 with a flexible joint, such as a rubber boot. Removably securing the sump 80 to the demister chamber 72 may be particularly useful for larger capacity units, such as a wastewater concentrator sized to process 100,000 gallons of wastewater per day or more. Thus, the releasable attachment mechanisms may make scaling the size of the wastewater concentrator 20 easier and more adaptable.

Turning again to FIG. 2A, the recirculation system includes a recirculation pipe system 104 that returns collected wastewater back to the nozzles 60 via the wastewater return pipes 61, and the sump pump 102 to pump the wastewater through the recirculation pipe system 104. The recirculation pipe system 104 includes a main return pipe 104a, which connects to a pipe 104b extending into the sump 80 through the side wall 96 and to a pump lifter pipe 104c or a hose connected to the sump pump 102. The main return pipe 104a connects to the wastewater return pipes 61 to feed the concentrated wastewater back to the nozzles 60.

A secondary return pipe 104d branches off from the main return pipe 104a and connects with a flowback water or produced water concentrating system 105, which will be further described with reference to FIG. 5. In one arrangement, the flowback water concentrating system 105 may be arranged to further concentrate the flowback water and to separate suspended solids into a thickened slurry before further processing in a batch treatment plant. Thickened slurry is the result of settling suspended solids which are primarily the result of forced precipitation within the concentrator system 118. The flowback water concentrating 105 may include one or more storage tanks or settling tanks in which suspended solids are allowed to settle out of and be separated from the concentrated flowback water. The liquid portion of the concentrated flowback water, which includes high concentrations of dissolved solids, such as dissolved salts, may be drawn off for further use as injection water for injection wells, or other similar uses.

At least one drain port 106 is preferably disposed at the bottom of the sump, such as through the side wall 98 and/or through the bottom wall 100, in order to facilitate removal of accumulated sludge or slurry from the sump. The drain port 106 may be a flanged outlet pipe stub as shown in the drawings arranged for connection to removal piping or any other removal system. The drain port 106 may be connected by appropriate pipes and pumps with other ancillary processors, for further separation of solids from liquids. In some arrangements, the drain port 106 includes a valve to allow selective removal of sludge or slurry, and the drain port is arranged for connection with a removal vehicle, such as a vacuum truck or waste holding tank.

A plurality of stub pipes 107 extend into the sump 80 through the sloped side walls 92, 94, 96, 98 for intake and/or discharge of raw or concentrated wastewater or other liquid between the sump 80 and other processors. In one arrangement, at least one stub pipe 107 is connected with a collection pipe 107a that draws liquid condensate from the bottom of the elbow 66; at least one and preferably two stub pipes 107 are connected with collection pipes 107b that connect to respective upper and lower drains from the exhaust assembly 28; a stub pipe 107 is connected with a return pipe 104e from the flowback water concentrating system 105; and a stub pipe 107 is connected with a return bypass line 107c from the main return pipe 104a. In other embodiments, the return pipe 104e may be diverted to a collection point for the concentrated flowback water, as will be described further hereinafter. Optionally, anti-foaming agents may be added to the concentrated wastewater, for example through a line 107d connected with the return bypass line 107c from a mixer 109.

An overflow drain 107e is located through the body to maintain the top level 160 of wastewater at or below the desired height. Preferably, the overflow drain 107e is located at a level arranged to form a liquid seal along a baffle or skirt 159 below the bottom of at least one, and preferably all of the demister panels 78a-c to be formed and/or maintained during operation.

A float or skimmer tray 108, such as a shallow pan or tray, is disposed on the one side wall of the body 70 at a level expected to be a top water line as defined by the sump pump 102 or other means. The skimmer tray 108 drains to an overflow pipe, which in some arrangements is connected with the recirculation pipe system 104 to return any overflow for reprocessing through the portable wastewater concentrator 20.

The exhaust assembly 28 in a preferred arrangement includes the air pump 30 and the power source 32. The air pump 30 is operatively connected with the confined gas flow path P to draw the gases through the liquid evaporator assembly 24 and the gas-liquid separator 26 and out the exhaust assembly 28 to the surrounding atmosphere. The air pump 30 may be operatively arranged in any location sufficient to effectuate movement of gases along the confined gas flow path P as described. In a preferred arrangement shown in the drawings, the air pump 30 includes a centrifugal fan with a shroud 110 that surrounds fan blades 111 and has an inlet that connects with the exhaust outlet 76 of the gas-liquid separator 26 and an outlet that connects with an optional exhaust stack 112 (shown in FIG. 4). The shroud 110 defines a third portion P3 of the confined gas flow path P from the inlet to the outlet. The power source 32 may be any power source sufficient to rotate a drive shaft that is attached to the air pump 30 and arranged to drive the fan blades, such as a gas or diesel internal combustion engine, a steam engine, an electric motor, a servo motor, a water paddle wheel, etc. Preferably, the power source 32 is arranged to drive the fan blades 111 at selected different speeds in order to be able to control the velocity and/or flow volume of gases along the confined gas flow path P at least as described herein below. In the depicted arrangement, the power source 32 is located adjacent to the fan 30 opposite the gas-liquid separator 26 and drives a shaft 114 that is arranged to rotate the fan blades 111. The exhaust assembly 28 may further include additional ducts (not shown) to partly define the third portion P3 of the confined gas flow path P from the gas-liquid separator 26 to the exhaust stack 112 as desired for particular special arrangements and other design criteria peculiar to a particular application.

The exhaust stack 112 may take any form sufficient to direct exhaust from the outlet of the shroud 110 to the atmosphere, such as a vertical cylindrical shape shown in the drawings, and is separable from the shroud 110 and the remaining portions of the exhaust assembly 28. In a preferred arrangement, the exhaust stack 112 is not carried by the skid 34, but rather is carried separately from the portable wastewater concentrator 20 and attached to the outlet of the shroud 110 at the operation site by any convenient means, such as with bolts or by welding. The exhaust stack 112 may be supported by a support surface separate from the skid 34.

A crane 116 is supported by the lift frame 40 above the top access openings 82 and arranged to install and remove the demister panels 78 through the upper portals top access openings 82. The crane 116 in one arrangement is in the form of an overhead or gantry crane and includes a support beam 118, such as an I-beam, C-section beam, or box beam, supported by opposite cross-beams 40b over the upper portals and carrying a lift 120, such as a pulley, a cable hoist, or other lifting mechanism. The support beam 118 may be movable along the cross-beams 40b, by being supported on trolleys or other moveable support system for example, to allow the support beam 118 to travel along the cross-beams 40b from the inlet 74 of the gas-liquid separator 26 to the exhaust outlet 76. The lift 120 may be supported by the support beam 118 and may also be movable along the cross-beams 40b by another movable support system, such as trolleys (not shown). Thereby, the lift 120 preferably is movable along two crossing axes defined by the cross-beams 40b and the support beam 118 to be positioned over all areas of at least the gas-liquid separator 26 and more preferably also over at least portions of the liquid evaporator assembly 24. In the depicted arrangement, the support beam 118 is oriented substantially perpendicular to the second portion P2 of the confined gas flow path P and moves along the cross-beams 40b substantially parallel with the second portion of the confined gas flow path. Optionally, each demister panel 78 includes a projection 122, such as a T-member or hook, arranged to be inserted into a track 124 defined along the support beam 118 and the projection 122 slides along the track 124 when the demister panel 78 is removed from the respective top access opening 82. The track 124 is preferably aligned transverse to the second portion P2 of the confined gas flow path P. The track 124 includes an open end 126 arranged to receive and release the projection 122 near, such as directly above, the top access opening 82, and the projection 122 preferably includes a roller 128, such as one or more caster wheels, that are received within the track 124 and facilitate moving the demister panel 78 transversely along the track. In another arrangement, the crane 116 is in the form of a jib crane (not shown). In this arrangement, the support beam 118 forms a boom that is arranged to rotate horizontally over the top of at least the gas-liquid separator 26. The support beam 118 of the jib crane may be supported directly from one of the beams 40b of the lift frame 40 or may be supported by a vertical support, such as one of the columns 40a or a separate column (not shown), and arranged to rotate about the vertical support.

Figure 4:
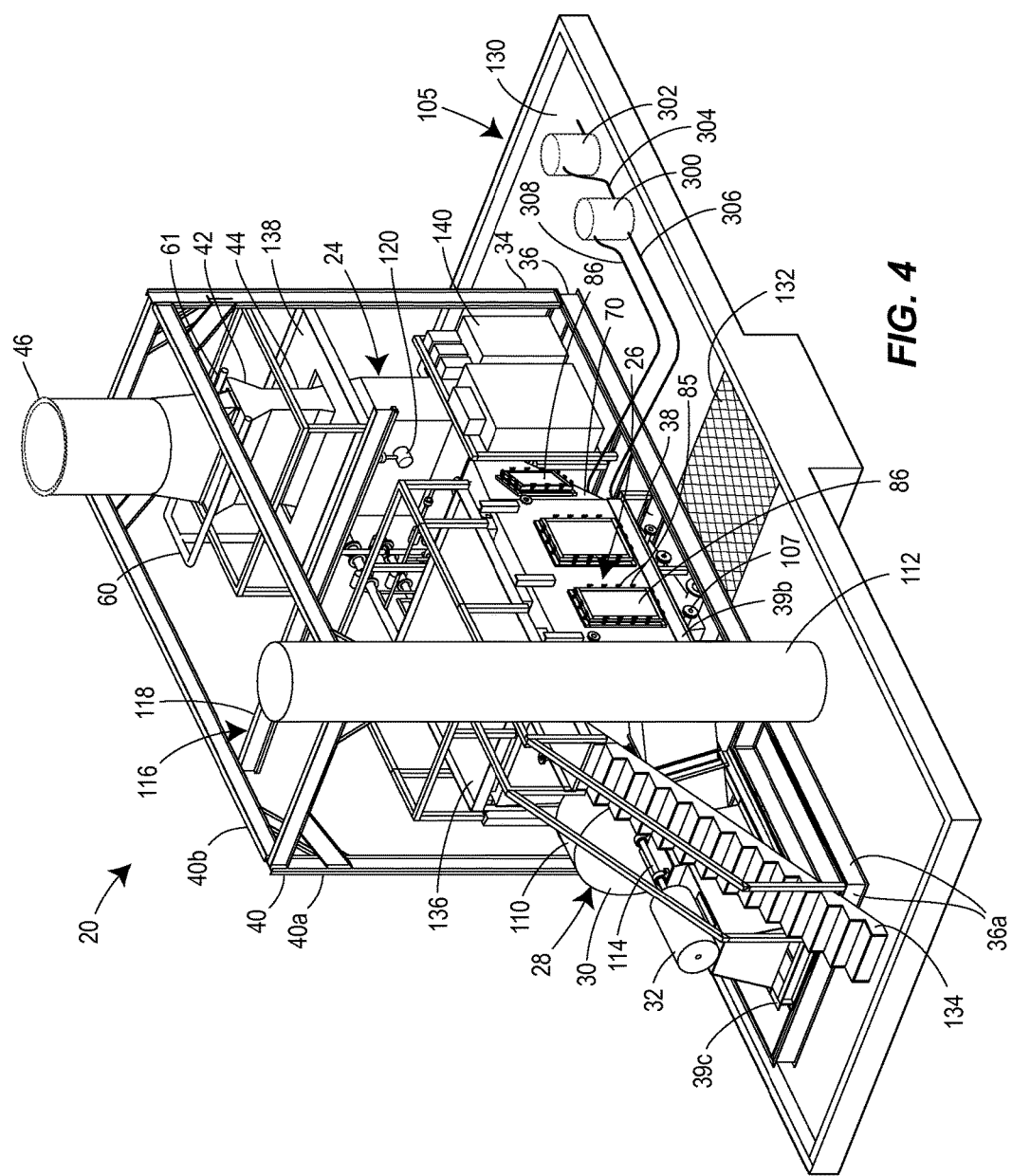
FIG. 4 is an isometric view of the wastewater concentrator assembly connected to a flowback water or a produced water concentration system.

Referring now particularly to FIG. 4, the wastewater concentrator 20 is illustrated operatively assembled at an operation site and located on a support surface, such as a concrete pad 130 on the ground, that includes a recess, such as a trough 132, arranged to receive the portion of the sump 80 that projects below the skid 34. Appropriate covering, such as grating, may cover portions the trough 132. The skid 34 rests directly on and is supported by the concrete pad 130 and preferably maintains the remaining components of the wastewater concentrator 20 elevated above the top surface of the concrete pad 130. The exhaust stack 112 rests on the concrete pad 130 directly adjacent to the skid 34. Additional accessory structures, such as an access stair 134 and access platforms 136 and 138 also may be attached to the wastewater concentrator 20 at the operation site in any convenient manner, such as welding or bolting. The access stair 134 is arranged to allow an operator to climb from the concrete pad 130 to the access platform 136, which preferably is located over the top of the gas-liquid separator 26 and below the crane 116, to provide ready access to the top access openings 82 and the removable hatches 84. The access platform 138 is arranged to provide access to the liquid evaporator assembly 24, such as by providing a walking platform surrounding the venturi assembly 44 at a height sufficient to provide easy access to the injection nozzles 60. Other access structures may be included, such as additional walk ways, ladders, and platforms. Structures such as the access stairs 134, access platforms 136 and 138, the exhaust stack 112, and the header connection assembly 50 are preferably attached to the wastewater concentrator 20 at the operation site after the skid 34 has been placed in the intended operating location, such as on the concrete pad 130. These structures are preferably pre-formed to be easily attached by any method that requires a minimum of construction effort on site, such as with bolts, clips, and/or welding.

The flowback water concentrating system 105 may be located on the concrete pad 130 proximate the wastewater concentrator 20. In other embodiments, the flowback water concentrating 105 may be located on the skid 34 and transported with the wastewater concentrator 20 as a single unit. The flowback water concentrating system 105 includes a settling tank 300 and an optional thickened slurry storage tank 302 that are fluidly connected to one another by a connecting pipe 304. The settling tank 300 is fluidly connected to the sump 80 by an inlet pipe 306, which directs concentrated liquid from the sump 80 to the settling tank 300. The concentrated liquid is further separated and concentrated in the settling tank 300 where suspended solids settle toward the bottom leaving concentrated supernatant liquid toward the top of the settling tank 300, the supernatant liquid containing substantially reduced amounts of suspended solids and concentrated amounts of dissolved solids. A portion of the liquid constituent may be drawn off and fed back to the sump 80 through return line 306 for further evaporation/concentration. In other embodiments, a portion of the liquid constituent may be drawn off and stored for further use, for example, as fracking water, as will be described further hereinafter, when the liquid constituent reaches a desired dissolved solids concentration. A thickened portion of the slurry may be fed to the storage tank 302 through the connecting line 304 for storage and/or further disposal. The flowback water concentrating system 105 will be discussed in more detail below with respect to FIG. 5.

A control panel 140 is preferably included as part of the wastewater concentrator 20, such as by being secured to the skid 34, with power supply and control wiring for various components that require electrical power or other electrical wiring, such as the air pump 30, sump pump 102, movable orifice plate 68, crane 116, and control systems. The control panel 140 preferably also includes any hydraulic controls and/or other controls for other various portions of the portable wastewater concentrator 20. The control panel 140 is preferably pre-connected to the various components so that the no significant wiring or connects need to be made after the wastewater concentrator 20 arrives at an operation site. The control panel 140 in some arrangements includes a main power hook-up for connection to electrical power supplied at the operation site. In other arrangements, the control panel 140 is adapted to receive electrical and/or hydraulic power from generators and/or hydraulic pumps, respectively, powered by the power source 32 and attached as part of the wastewater concentrator 20.

Figure 5:
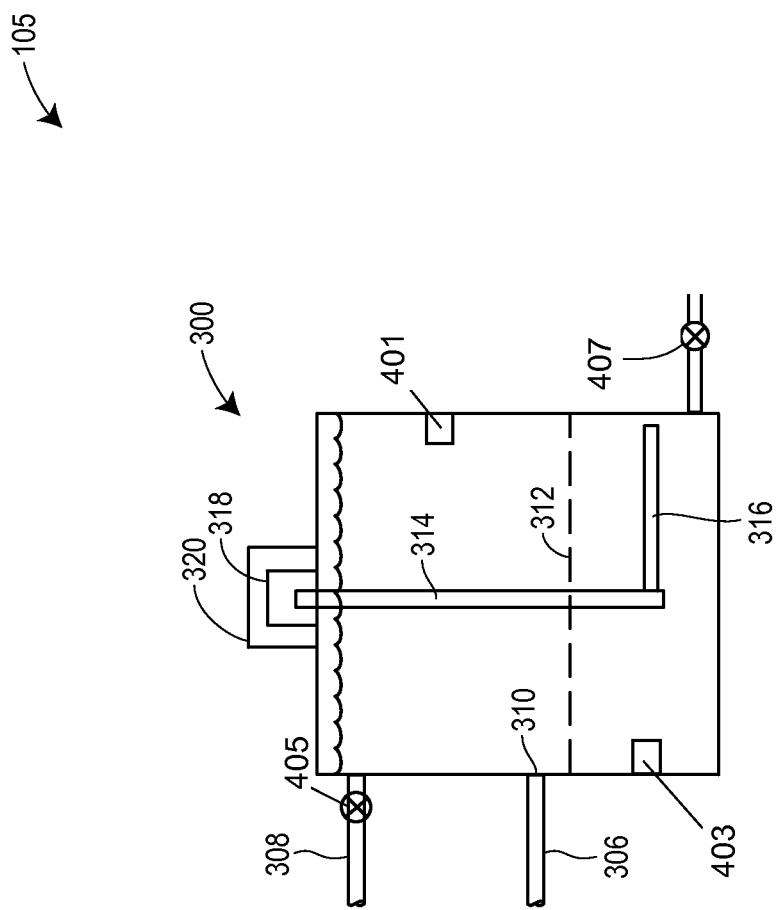
FIG. 5 is a side cross-sectional view of a storage tank of the flowback water or produced water concentration system of FIG. 4.

Turning now to FIG. 5, a portion of the flowback water concentrating system 105 is illustrated in more detail. As discussed above, the settling tank 300 is fluidly connected to the sump 80 of the wastewater concentrator 20 by an inlet pipe 306 and an outlet pipe 308 may be fluidly connected to a holding tank (not shown) for storing concentrated liquid (i.e., heavy brine). A pump may deliver concentrated liquid from the sump 80 to the settling tank 300 periodically or continually when a desired dissolved solids concentration of the concentrated liquid is reached. In one embodiment, the desired concentration may include between 50% and 70% total solids with between 20% and 40% suspended solids. The concentrated liquid enters the settling tank 300 through an inlet 310. Once inside the settling tank 300, suspended solids settle towards the bottom of the settling tank 300 forming a solids-liquid boundary 312. Below the solids-liquid boundary 312, settled suspended solids may make up more than 80% of the slurry while above the solids-liquid boundary 312, the concentrated supernatant liquid is substantially free of suspended solids.

Although the slurry below the solids-liquid boundary 312 is primarily made up of combined dissolved and suspended solids, a significant amount of liquid may still be present. An optional stirring rod 314 and rake 316 rotate within the settling tank 300 at a relatively slow rate, preferably between 1 RPM and 10 RPM, more preferably between 1.5 RPM and 5 RPM and even more preferably between 1.5 RPM and about 3 RPM. Stirring the slurry below the solids-liquid boundary 312 gently agitates the slurry, and more particularly agitates the suspended solid particles within the slurry, causing the suspended solid particles to settle further towards the bottom of the settling tank 300 thereby ensuring that the supernatant liquid above the solids-liquid boundary 312 remains substantially free of suspended solids, thereby further concentrating the solids in the slurry below the solids-liquid boundary 312. Generally, the solids below the solids-liquid boundary 312 are further concentrated to more than 90% solids and less than 10% liquid.

On the other hand, the supernatant liquid above the solids-liquid boundary 312 is substantially free of suspended solids (e.g., less than about 5% suspended solids) while being concentrated with respect to dissolved solids (such as salts). The supernatant liquid above the solids-liquid boundary 312 may be concentrated to a density of 10 lb/gal or more, and more particularly to a density of 12 lb/gal or more and more particularly to a density of 14 lb/gal or more, depending on the type of salt dissolved in the supernatant liquid.

The settling tank 300 may include a supernatant liquid concentration sensor 401 that measures the concentration of dissolved solids in the supernatant liquid. Similarly, the settling tank 300 may include a slurry concentration sensor 403 that measures a concentration of total suspended solids in the slurry below the solids-liquid boundary 312. The liquid concentration sensor 401 and the slurry concentration sensor 403 may be operatively connected to a controller (not shown), which may control a concentrated liquid valve 405 and a concentrated slurry valve 407, to control removal of the concentrated liquid and/or the concentrated slurry from the settling tank 300.

Once a desired level of solid concentration is reached, slurry from below the solids-liquid boundary 312 may be pumped or otherwise delivered to the storage tank 302 through the concentrated slurry valve 407.

In one preferred embodiment, the settling tank 300 may be approximately 16 feet tall, having a diameter of approximately 10 feet, with design specifications allowing storage of approximately 8,000 gallons at up to 1.6 specific gravity (13.34 lb/gal), or more. The settling tank 300 may have an open top for operating at atmospheric pressures. The inside of the settling tank 300 may include a protective epoxy liner for protecting the settling tank 300 from corrosion or other damage from e.g., salt solutions and other damaging compounds. In one embodiment, the epoxy liner may be approximately 30 mil thick. An outside of the settling tank 300 may include a dual layer protective coating having a first layer of approximately 6 mil thick epoxy and a second layer of approximately 2.5 mil thick acrylic polyurethane. An agitator gear box 318 may be connected to a motor, such as an electric motor 320, to drive the stirring rod 312. The electric motor in one embodiment may be a 2 HP 460 V, 3 phase, 60 HZ TEFC motor that delivers approximately 70,400 in-lb of maximum torque at approximately 2 RPM. The agitator gear box may include a heavy duty single reduction, single planetary gear, balance weight driven assembly.

In one embodiment, the concentrated supernatant liquid in the settling tank may be concentrated to approximately 10 lb/gal when the primary dissolved solid is sodium chloride. In another embodiment, the concentrated supernatant liquid in the settling tank may be concentrated to approximately 12 lb/gal when the primary dissolved solid is calcium chloride or magnesium chloride. In any event, the concentrated supernatant liquid may be used as heavy brine to increase down bore pressures in natural gas wells or to act as an anti-freeze for fracking water during cold weather operations. In yet other embodiments, the heavy brine may be used to increase down bore pressures in injection wells or oil recovery wells. In yet other embodiments, the heavy brine may be used as a capping fluid to prevent blow outs in oil wells when the oil well punctures an oil pocket.

The methods and devices for concentrating dissolved solids described herein may be useful for concentrating dissolved solids in many different applications. In some uses, the methods and devices can provide environmental benefits by concentrating potentially harmful compounds that are reused in hydro-fracking operations, thereby returning the potentially harmful compounds to their locations of origin, far below the earth's surface and well below any aquifers that are used by the human population. Additionally, the methods and devices described herein reduce operating costs of hydro-fracking operations by reducing the amount of heavy brines that must be purchased during cold weather operations.

Numerous modifications to the present methods and devices will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the present or any future claims are reserved. All patents, patent applications, and other printed publications identified in this foregoing are incorporated by reference in their entireties herein.

The invention claimed is:

1. A method of concentrating dissolved solids in flowback water or produced water from a natural gas well, the method comprising:
    collecting one of flowback water and produced water from a natural gas well;
    evaporating a portion of the flowback water or produced water in a liquid concentrator by injecting the flowback water or produced water into a mixing chamber and mixing the flowback water or produced water with a stream of gas, and producing a partially concentrated liquid;
    collecting the partially concentrated liquid in a gas-liquid separator and, from the gas-liquid separator, directing a portion of the partially concentrated liquid to the mixing chamber downstream of the injecting of the flowback water or produced water and directing another portion of the partially concentrated liquid to a settling tank;
    separating the partially concentrated liquid in the settling tank into a supernatant liquid that is substantially free of suspended solids and a concentrated slurry;
    measuring a level of dissolved solids in the supernatant liquid in the settling tank; and
    extracting a portion of the supernatant liquid when a concentration for the dissolved solids in the supernatant liquid is 10 lb/gal or more.

2. The method of claim 1, wherein the concentration is 12 lb/gal or more.

3. The method of claim 2, wherein the concentration is 14 lb/gal or more.

4. The method of claim 1, wherein the dissolved solids in the supernatant liquid comprise sodium chloride.

5. The method of claim 1, wherein the dissolved solids in the supernatant liquid comprise calcium chloride.

6. The method of claim 1, wherein the dissolved solids in the supernatant liquid comprise magnesium chloride.

7. The method of claim 1, further comprising mixing the extracted supernatant liquid with fracking water for a natural gas well.

8. The method of claim 1, further comprising injecting at least a portion of the extracted supernatant liquid into a natural gas well.

9. The method of claim 8, wherein the extracted supernatant liquid increases down bore pressure of fluid in the natural gas well.

10. A method of increasing down bore pressure in a natural gas well, the method comprising:
    collecting flowback water or produced water from a natural gas well;
    evaporating a portion of the flowback water or produced water in a wastewater concentrator by injecting the flowback water or produced water into a mixing chamber and mixing the flowback water or produced water with a stream of gas, and producing a partially concentrated liquid;
    collecting the partially concentrated liquid in a gas-liquid separator and, from the gas-liquid separator, delivering a portion of the partially concentrated liquid to the mixing chamber downstream of the injecting of the flowback water or produced water and directing another portion of the partially concentrated liquid to a settling tank;

separating the partially concentrated liquid in the settling tank into a supernatant liquid that is substantially free of suspended solids and a thickened slurry;

measuring a concentration level of dissolved solids in the supernatant liquid in the settling tank;

extracting a portion of the supernatant liquid when the concentration level of dissolved solids in the supernatant liquid is 10 lb/gal or more; and pumping a portion of the extracted supernatant liquid into a natural gas well.

11. The method of claim 10, wherein the concentration is 12 lb/gal or more.

* * * * *